United States Patent
Talarico et al.

(10) Patent No.: US 12,557,108 B2
(45) Date of Patent: Feb. 17, 2026

(54) EXPANDED PUCCH TRANSMISSION BANDWIDTH FOR HIGH CARRIER FREQUENCY OPERATION

(71) Applicant: Intel Corporation, Santa Clara, CA (US)

(72) Inventors: Salvatore Talarico, Los Gatos, CA (US); Gang Xiong, Beaverton, OR (US); Yingyang Li, Beijing (CN); Daewon Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 18/267,903

(22) PCT Filed: Jan. 12, 2022

(86) PCT No.: PCT/US2022/012094
§ 371 (c)(1),
(2) Date: Jun. 16, 2023

(87) PCT Pub. No.: WO2022/155183
PCT Pub. Date: Jul. 21, 2022

(65) Prior Publication Data
US 2024/0121784 A1 Apr. 11, 2024

Related U.S. Application Data

(60) Provisional application No. 63/245,421, filed on Sep. 17, 2021, provisional application No. 63/216,379, (Continued)

(51) Int. Cl.
*H04W 72/21* (2023.01)
*H04L 5/00* (2006.01)

(52) U.S. Cl.
CPC ......... *H04W 72/21* (2023.01); *H04L 5/0094* (2013.01)

(58) Field of Classification Search
CPC ............... H04W 72/21; H04L 5/0094
(Continued)

(56) References Cited

U.S. PATENT DOCUMENTS

2020/0008156 A1* 1/2020 Yin ............... H04L 1/1858

FOREIGN PATENT DOCUMENTS

| WO | WO-2020145355 A1 * | 7/2020 | ........... H04L 5/0055 |
| WO | WO-2020145356 A1 | 7/2020 | |

(Continued)

OTHER PUBLICATIONS

R1-2008045, 3GPP TSG RA'-T WGI #103-e, e-Meeting, Nov. 1, 2020 (Year: 2020).*

(Continued)

*Primary Examiner* — Intekhaab A Siddiquee
(74) *Attorney, Agent, or Firm* — Schwegman Lundberg & Woessner, P.A.

(57) ABSTRACT

A user equipment (UE) configured for carrier frequency operations above 52.6 GHz may decode radio-resource control (RRC) signalling received from a gNodeB (gNB) to configure the UE with a number of resource blocks (RBs) ($N_{RB}$) for a physical uplink control channel (PUCCH) resource for each of one or more enhanced PUCCH formats. The one or more enhanced PUCCH formats may include enhanced PUCCH format 0, enhanced PUCCH format 1 and enhanced PUCCH format 4. The number of RBs may be configurable to be more than one for the enhanced PUCCH format 0, the enhanced PUCCH format 1 and the enhanced PUCCH format 4. The UE may encode an enhanced PUCCH format for transmission in accordance with one of the enhanced PUCCH format 0, the enhanced PUCCH (Continued)

format 1 and the enhanced PUCCH format 4. The enhanced PUCCH format may be transmitted to occupy the number of RBs that are configured.

13 Claims, 6 Drawing Sheets

Related U.S. Application Data filed on Jun. 29, 2021, provisional application No. 63/191,683, filed on May 21, 2021, provisional application No. 63/170,952, filed on Apr. 5, 2021, provisional application No. 63/137,422, filed on Jan. 14, 2021.

(58) Field of Classification Search
USPC .......................................................... 370/329
See application file for complete search history.

(56) References Cited

FOREIGN PATENT DOCUMENTS

| WO | WO-2020205741 A1 | 10/2020 |
|----|------------------|---------|
| WO | WO-2022155183 A1 | 7/2022  |

OTHER PUBLICATIONS

R1-2008549, 3GPP TSG RAN WGI #103, e-Meeting, Nov. 1, 2020 (Year: 2020).*

"European Application Serial No. 22739965.6, Extended European Search Report mailed Nov. 20, 2024", 11 pgs.

Moderator, "103 eNR52 71 Waveform Changes Discussions Summary #3", 3GPP Draft; R1-2009667, 3rd Generation Partnership Project (3GPP), Mobile Competence Centre; 650, Route Des Lucioles; F-06921 Sophia-Antipolis Cedex; France vol. RAN Wg1, No. E-Meeting, [Online]. Retrieved from the Internet: URL :https : ftp.3gpp.orgtsg_ran WGI_RLI TSGR1_1O3-e Docs RI 2009667. zip R1-2009667NR 60ghz email, (Nov. 10, 2020), Oct. 26, 2020-Nov. 13, 2020.

Nokia, "Required changes to NR using existing DL UL NR waveform", 3GPP Draft; R1-2006907, 3rd Generation Partnership Project (3GPP), Mobile Competence Centre; 650, Route Des Lucioles; F-06921 Sophia-Antipolis Cedex; France vol. RAN Wg1, No. E-Meeting, [Online]. Retrieved from the Internet: https : ftp.3gpp. org tsg_ran WGI_RLI TSGRI_102-e Docs RI-2006907.zip R1-2006907Required changes to NR using existingDL-UL NR waveform.docx, (Aug. 7, 2020), Aug. 17, 2020-Aug. 29, 2020.

"3GPP; TSG RAN; NR; Physical layer procedures for control (Release 16)", 3GPP TS 38.213 V16.4.0, (Jan. 8, 2021).

"International Application Serial No. PCT/US2022/012094, International Preliminary Report on Patentability mailed May 11, 2023", 6 pgs.

"International Application Serial No. PCT/US2022/012094, International Search Report mailed Apr. 20, 2022", 3 pgs.

"International Application Serial No. PCT/US2022/012094, Written Opinion mailed Apr. 20, 2022", 4 pgs.

"Potential Enhancements for NR on 52.6 to 71 GHz", R1-2008549, 3GPP TSG RAN WG1 #103, (Nov. 1, 2020).

LG Electronics, "Consideration on required physical layer changes to support NR above 52.6 GHz", R1-2008045, 3GPP TSG RAN WG1, (Nov. 1, 2020).

"European Application Serial No. 22739965.6, Response filed Jun. 10, 2025 to Extended European Search Report mailed Nov. 20, 2024", w/ English Claims, 20 pgs.

* cited by examiner

EXPANDED PUCCH TRANSMISSION BANDWIDTH FOR HIGH CARRIER FREQUENCY OPERATION

PRIORITY CLAIMS

This application claims priority to U.S. Provisional Patent Application Ser. No. 63/137,422 filed Jan. 14, 2021 [reference number AD4587-Z], U.S. Provisional Patent Application Ser. No. 63/170,952 filed Apr. 5, 2021 [reference number AD5798-Z], U.S. Provisional Patent Application Ser. No. 63/191,683, filed May 21, 2021 [reference number AD6760-Z], U.S. Provisional Patent Application Ser. No. 63/216,379 filed Jun. 29, 2021 [reference number AD7545-Z], and U.S. Provisional Patent Application Ser. No. 63/245,421 filed Sep. 17, 2021 [reference number AD8875-Z], which are each incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments relate to enhanced physical uplink control channel (PUCCH) formats for high carrier frequency operations.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with 5G NR systems is that certain legacy PUCCH formats have a limited bandwidth, thus limiting what a UE can send to a gNode B as part up unlink control information (UCI), for example.

DETAILED DESCRIPTION

Figure 1A:
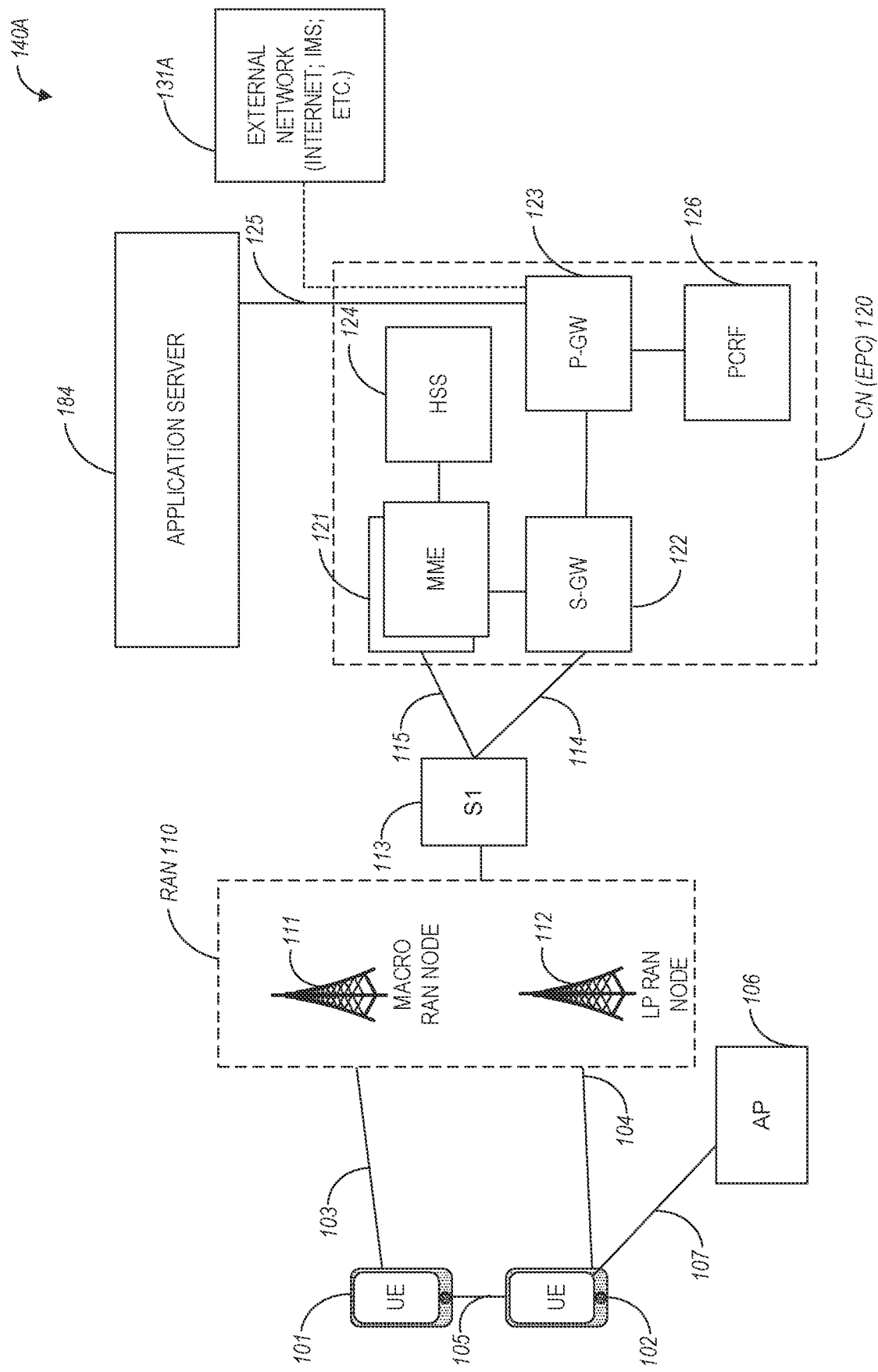
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operating in a fifth-generation (5G) new radio (NR) and/or a sixth generation (6G) network. When the UE is configured for operating at a carrier frequency above 52.6 GHz, the UE may be configured to decode radio-resource control (RRC) signalling received from a gNodeB (gNB). The RRC signalling may comprising an RRC parameter to configure the UE with a number of resource blocks (RBs) ($N_{RB}$) for a physical uplink control channel (PUCCH) resource for each of one or more enhanced PUCCH formats. The one or more enhanced PUCCH formats may include enhanced PUCCH format 0, enhanced PUCCH format 1 and enhanced PUCCH format 4. In these embodiments, the UE may encode an enhanced PUCCH format for transmission. The enhanced PUCCH format may be encoded in accordance with one of the enhanced PUCCH format 0, the enhanced PUCCH format 1 and the enhanced PUCCH format 4. In these embodiments, the number of RBs may be configurable to be more than one for the enhanced PUCCH format 0, the enhanced PUCCH format 1 and the enhanced PUCCH format 4. In these embodiments, the enhanced PUCCH format may be transmitted to occupy the number of RBs that are configured. In some embodiments, the UE store the number of RBs for each of the enhanced PUCCH formats that are configured. These embodiments are described in more detail below.

In some embodiments, the one or more enhanced PUCCH formats configured by the RRC parameter may be limited to only enhanced PUCCH format 0, enhanced PUCCH format 1 and enhanced PUCCH format 4, although the scope of the embodiments is not limited in this respect.

In some embodiments, the RRC signalling configures the UE with the number of RBs ($N_{RB}$) for each of a plurality of subcarrier spacings (SCS) for each of the PUCCH formats, In these embodiments, the number of RBs ($N_{RB}$) configured to the UE ranging from a minimum of one RB for PUCCH format 0, PUCCH format 1 and PUCCH format 4 for all SCS to a maximum value, In these embodiments, the configured number of RBs is based, at least in part, on the PUCCH format and the SCS.

In some of these embodiments, the maximum configured number of RBs ($N_{RB}$) for enhanced PUCCH format 0, enhanced PUCCH format 1 and enhanced PUCCH format 4 is sixteen (16) RBs for subcarrier spacings of 120 kHz, 480 kHz and 960 kHz, although the scope of the embodiments is not limited in this respect.

In some embodiments, the RRC signalling comprises a parameter that is provided by UE specific signalling per bandwidth part (BWP). In some embodiments, the parameter may be signaled via RRC signalling in system information block 1 (SIB1) message, although the scope of the embodiments is not limited in this respect.

In some embodiments, for operating at a carrier frequency above 52.6 GHz, the UE may generate a base sequence for the enhanced PUCCH format 0 and the enhanced PUCCH format 1 based on a Type-1 low peak-to-average power ratio (PAPR) sequence of length equal to a total number of resource elements (REs) over which PUCCH resources are mapped. In these embodiments, for operating at a carrier frequency below 52.6 GHz, the UE may be configured to generate a base sequence for a legacy PUCCH format 0 and a legacy PUCCH format 1 based on a Type-1 low PAPR sequence of a fixed length. In these embodiments, the sequence is generated via Type 1 low PAPR sequence which is now longer than that for the legacy PUCCH format 0 and 1. For the legacy PUCCH format 0 and 1, the sequence is fixed and of length-12, while for the enhanced PUCCH format 0 and 1 the sequence length changes based on the allocated RBs over which the PUCCH may span, and it is of length-12×the number of RBs. According, the length of the sequence for enhanced PUCCH format 0 and the enhanced PUCCH format 1 changes based on the number of REs over which the PUCCH may span.

In some embodiments, for the enhanced PUCCH format 4 the number of RBs ($N_{RB}$) is equal to $2^{\alpha_2}*3^{\alpha_3}*5^{\alpha_5}$ (i.e., $N_{RB}=2^{(\alpha_2)}\cdot3^{(\alpha_3)}\cdot5^{(\alpha_5)}$), where $\alpha_2$, $\alpha_3$, and $\alpha_5$ comprise a set of non-negative integers. In these embodiments, for transmission of the PUCCH, the UE may to determine physical resource block (PRB) indices for each PUCCH transmission based on the number of RBs ($N_{RB}$). In these embodiments, the lowest-indexed RB for each PUCCH resource is a function of $N_{RB}$.

In some embodiments, when frequency hopping is enabled and a specific PUCCH resource set is to be used, the PUCCH is transmitted in non-overlapping hops. In these embodiments, for the frequency hopping, the UE may determine the PRB indices for each hop of the PUCCH transmission based on the BWP, the specific resource set used, the number of initial cyclic shift indexes, and the number of RBs ($N_{RB}$) over which the PUCCH spans. In these embodiments, unlike legacy techniques, a lowest-indexed PRB for each PUCCH resource for each hop is scaled based on the number of RBs ($N_{RB}$), although the scope of the embodiments is not limited in this respect. In these embodiments, frequency hopping may comprise two hops (i.e., a first hop and a second hop). Once the PRB location in the first half of the BWP for the first hop is calculated, a similar location in the second half of the BWP for the second hop may then be calculated.

In some embodiments, for transmission of the PUCCH, the UE may determine an initial cyclic shift index from a total number of initial cyclic shift indexes within an index set for the PUCCH transmission.

In some embodiments, for operating the carrier frequency below 52.6 GHz, the UE may be configured to transmit a legacy (i.e., non-enhanced) PUCCH format to occupy a single RB, the legacy PUCCH format comprising one of a legacy PUCCH format 0, a legacy PUCCH format 1 and a legacy PUCCH format 4.

In some embodiments, the UE may be configured to decode a PUCCH resource configuration (pucch-Resource-Common) information element that provides the UE with a PUCCH resource for transmission of the PUCCH.

In some embodiments, the enhanced PUCCH format is encoded to carry uplink control information (UCI). In these embodiments, the enhanced PUCCH format 0, the enhanced PUCCH format 1 and the enhanced PUCCH format 4 may be encoded to carry smaller payloads that include HARQ feedback information and a scheduling request (SR). The enhanced PUCCH format 4 may be encoded to carry larger payloads that may additionally include channel state information (CSI), for example.

Some embodiments are directed to a non-transitory computer-readable storage medium that stores instructions for execution by processing circuitry of a user equipment (UE) configured for operating in a fifth-generation (5G) new radio (NR) and/or a sixth generation (6G) network. In these embodiments, for operating at a carrier frequency above 52.6 GHz, the processing circuitry may be configured to decode radio-resource control (RRC) signalling received from a gNodeB (gNB). The RRC signalling may comprise an RRC parameter to configure the UE with a number of resource blocks (RBs) ($N_{RB}$) for a physical uplink control channel (PUCCH) resource for each of one or more enhanced PUCCH formats. The one or more enhanced PUCCH formats including only enhanced PUCCH format 0, enhanced PUCCH format 1 and enhanced PUCCH format 4. The processing circuitry may also be configured to encode an enhanced PUCCH format for transmission. The enhanced PUCCH format may be encoded in accordance with one of the enhanced PUCCH format 0, the enhanced PUCCH format 1 and the enhanced PUCCH format 4. In these embodiments, the number of RBs may be configurable to be more than one for the enhanced PUCCH format 0, the enhanced PUCCH format 1 and the enhanced PUCCH format 4. In these embodiments, the enhanced PUCCH format may be transmitted to occupy the number of RBs that are configured. These embodiments are described in more detail below.

Some embodiments are directed to a gNodeB (gNB) configured for operating in a fifth-generation (5G) new radio (NR) and/or a sixth generation (6G) network. For operating at a carrier frequency above 52.6 GHz, the gNB may be configured to encode radio-resource control (RRC) signalling for transmission to a user equipment (UE) comprising an RRC parameter to configure the UE with a number of resource blocks (RBs) ($N_{RB}$) for a physical uplink control channel (PUCCH) resource for each of one or more enhanced PUCCH formats. The one or more enhanced PUCCH formats may include enhanced PUCCH format 0, enhanced PUCCH format 1 and enhanced PUCCH format 4. The gNB may also be configured to decode an enhanced PUCCH format received from the UE in accordance with one of the enhanced PUCCH format 0, the enhanced PUCCH format 1 and the enhanced PUCCH format 4. In these embodiments, the number of RBs may be configurable to be more than one for the enhanced PUCCH format 0, the enhanced PUCCH format 1 and the enhanced PUCCH format 4 and the enhanced PUCCH format occupies the number of RBs that are configured. These embodiments are described in more detail below.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHZ and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
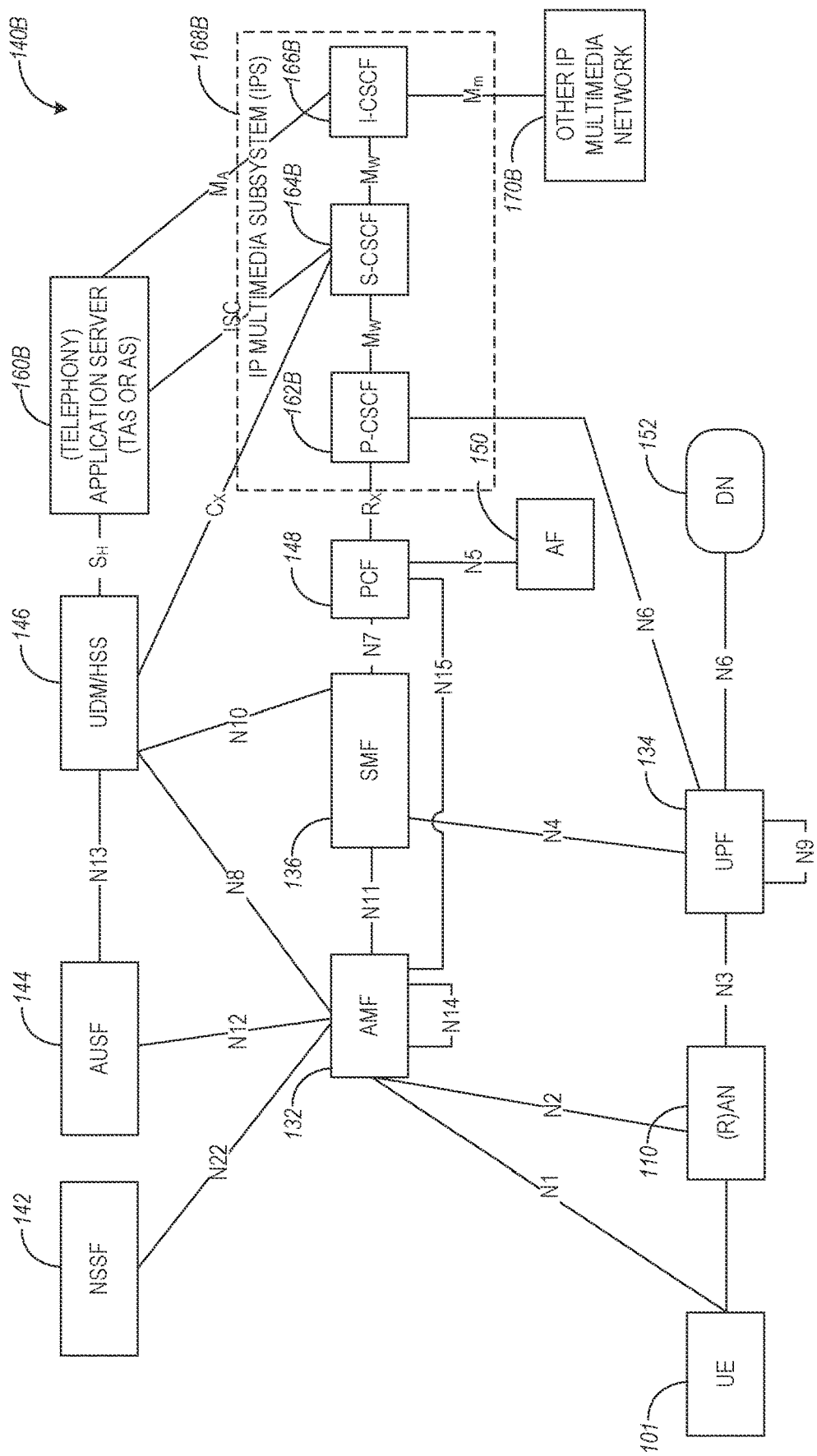
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
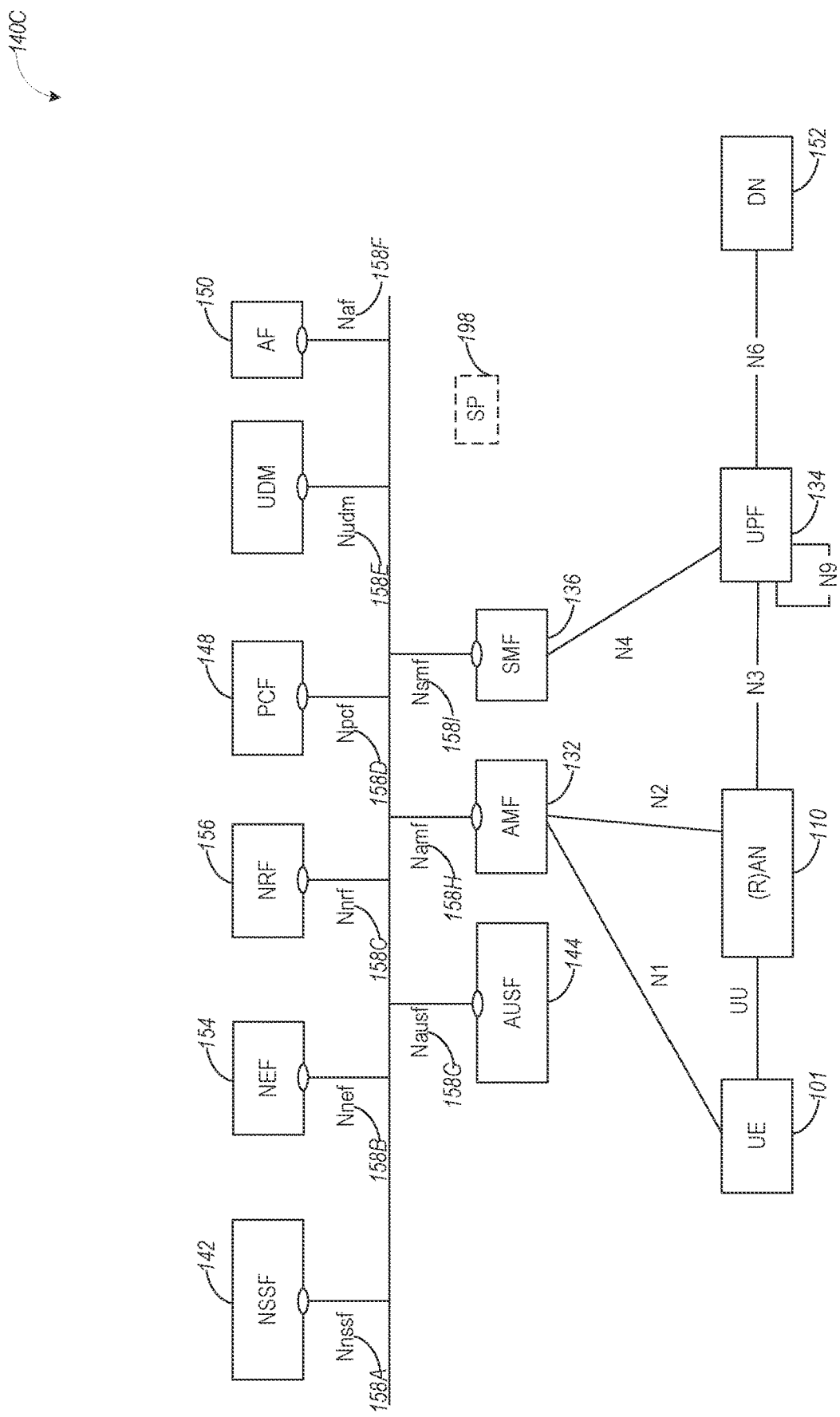

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a short-hand notation of the NR-based access to unlicensed spectrum, is a technology that enables the operation of NR systems on the unlicensed spectrum.

In NR Rel-15, short physical uplink control channel (PUCCH) (PUCCH format 0 and 2) can span 1 or 2 symbols and long PUCCH (PUCCH format 1, 3 and 4) can span from 4 to 14 symbols within a slot. Further, long PUCCH may span multiple slots to further enhance the coverage. In addition, for a given UE, two short PUCCHs as well as short PUCCH and long PUCCH can be multiplexed in a time division multiplexing (TDM) manner in a same slot.

Further, uplink control information (UCI) can be carried by PUCCH. In particular, UCI may include one or more of the following: scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

Figure 2A:
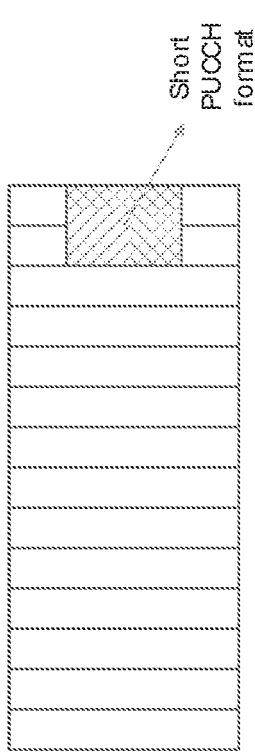
FIG. 2A illustrates long and short PUCCH format in a slot in NR, in accordance with some embodiments.
Figure 2A:
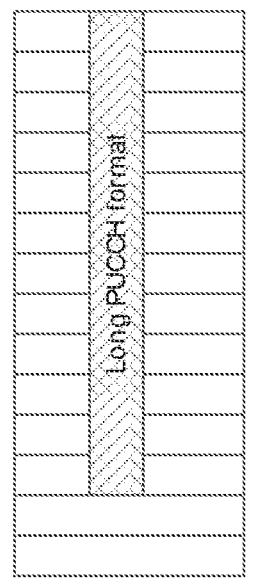

FIG. 2A illustrates one example of long PUCCH format and one of short PUCCH format, respectively. In this figure, the long PUCCH format spans over 12 symbols and the short PUCCH format spans over 2 symbols. Note that in NR, the number of physical resource blocks (PRB) for PUCCH format 2 and 3 can be configured by higher layers, where the maximum number of PRBs for PUCCH format 2 and 3 is 16. In addition, PUCCH format 0, 1 and 4, which are mainly targeted to carry a relatively small UCI payload size, only occupy 1 PRB in frequency domain. For system operating above 52.6 GHz carrier frequency, power spectral density (PSD) limit of 23 dBm/MHz is required in the ITU Region 1 (e.g., Europe and South Africa), while PSD limit of 13 dBm/MHz is required in South Korea. Following this regulatory requirement, the maximum transmit power is limited when UE transmits PUCCH format 0, 1 and 4 with 1 PRB resource allocation in frequency domain, which is not be desirable in terms of link budget and coverage. To address this issue, certain mechanisms may need to be considered to enhance these PUCCH formats for system operating above 52.6 GHz carrier frequency.

Embodiments herein provide PUCCH enhancements for system operating above 52.6 GHz carrier frequency. For example, embodiments include:

Enhancement on PUCCH format 0 and 1;
Enhancement on PUCCH format 4; and/or
Enhancement on PUCCH common resource set.

Enhancement on PUCCH Format 0 and 1

As mentioned above, in NR, the number of physical resource blocks (PRB) for PUCCH format 2 and 3 can be configured by higher layers, where the maximum number of PRBs for PUCCH format 2 and 3 is 16. In addition, PUCCH format 0, 1 and 4, which are mainly targeted to carry a relatively small UCI payload size, only occupy 1 PRB in frequency domain. For system operating above 52.6 GHz carrier frequency, power spectral density (PSD) limit of 23 dBm/MHz is required in the ITU Region 1 (e.g., Europe and South Africa), while PSD limit of 13 dBm/MHz is required in South Korea. Following this regulatory requirement, the maximum transmit power is limited when UE transmits PUCCH format 0, 1 and 4 with 1 PRB resource allocation in frequency domain, which is not be desirable in terms of link budget and coverage. To address this issue, certain mechanisms may need to be considered to enhance these PUCCH formats for system operating above 52.6 GHz carrier frequency.

Embodiments on enhancement of PUCCH format 0 and 1 are provided as follows:

In one embodiment, the number of PRBs for the transmission of PUCCH format 0 and 1 can be configured by higher layers via remaining minimum system information (RMSI) or dedicated radio resource control (RRC) signalling. To maintain a relatively high transmit power, maximum number of PRBs can be predefined in the specification for PUCCH format 0 and 1, which may also depend on the subcarrier spacing used for the PUCCH transmission. Furthermore, PUCCH format 0 and 1 are transmitted in contiguous PRBs in frequency domain. As an example, a maximum of 36 contiguous PRBs could be set for subcarrier spacing of 120 KHz, a maximum of 9 PRBs for subcarrier spacing of 480 KHz, and a maximum of 5 PRBs for subcarrier spacing of 960 KHz.

Within a PUCCH resource, both starting PRB and number of PRBs can be configured for PUCCH format 0 and 1.

Note that a subset of the number of PRBs can be configured by higher layers. More specifically for PF4, given a specific maximum number of PRBs, which is specific for a subcarrier spacing, the number of PRBs that can be selected are either all value or a group of values that are equal to $2^{\alpha_2} \cdot 3^{\alpha_3} \cdot 5^{\alpha_5}$, where $\alpha_2$, $\alpha_3$, $\alpha_5$ is a set of non-negative integers, while for PF0/1 this constrain is not used.

In another embodiment, when the number of PRBs for PUCCH format 0 and 1 is greater than 1, a long sequence can be used for signal generation, where the length of the sequence can be equal to the number of subcarriers for PUCCH format 0 and 1. For this option, base sequence generation as defined in Section 5.2.2 in TS 38.211 [1] can be reused for the transmission of PUCCH format 0 and 1. As an example: i) for subcarrier spacing of 120 KHz if the number of PRBs used is 36, then the base sequence is obtained by setting $N_{ZC}=431$ within the base sequence generation defined in Section 5.2.2.1 in TS38.211 [1]; for subcarrier spacing of 480 KHz if the number of PRBs used is 9, then the base sequence is obtained by setting $N_{ZC}=107$ within the base sequence generation defined in Section 5.2.2.1 in TS38.211 [1]; for subcarrier spacing of 960 KHz if the number of PRBs used is 5, then the base sequence is obtained by setting $N_{ZC}=59$ within the base sequence generation defined in Section 5.2.2.1 in TS38.211 [1].

In particular, when the number of PRBs is less than 3, base sequence generation as defined in Section 5.2.2.2 in TS38.211 [1] can be reused for $r_{u,v}^{(\alpha,\delta)}(n)$ for the signal generation for PUCCH format 0 and 1. Further, when the number of PRBs is greater than 2, base sequence generation as defined in Section 5.2.2.1 in TS38.211 [1] can be reused for $r_{u,v}^{(\alpha,\delta)}(n)$ for the signal generation for PUCCH format 0 and 1.

In another embodiment, when the number of PRBs for PUCCH format 0 and 1 is greater than 1, same base sequence with length 12 as defined in Rel-15 PUCCH format 0 and 1 can be reused for each PRB. Further, cyclic shift hopping can be applied on the PUCCH transmission in different PRBs. This indicates that different cyclic shifts are applied for the transmission of PUCCH in different PRBs.

Figure 2B:
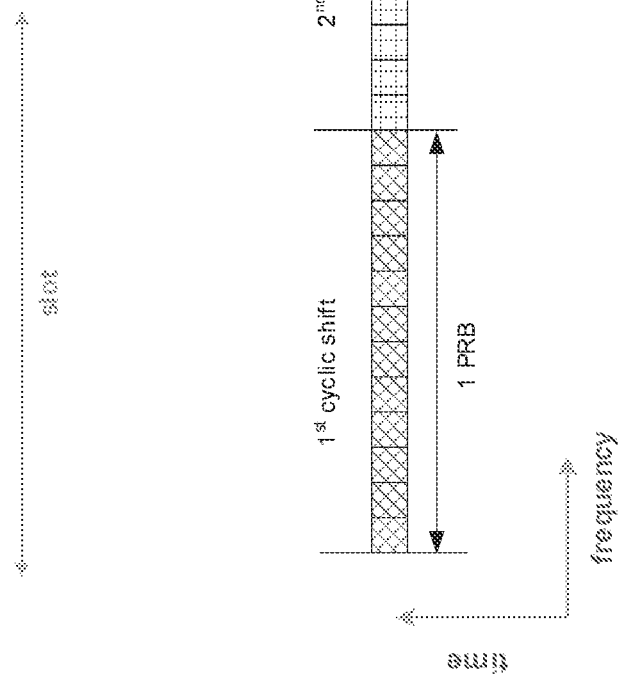
FIG. 2B illustrates cyclic shift hopping for PUCCH transmission with more than one physical resource block (PRB), in accordance with some embodiments.

FIG. 2B illustrates one example of cyclic shift hopping for PUCCH transmission with N PRBs. In the figure, different cyclic shifts are applied for the transmission of PUCCH in different PRBs.

In one option, cyclic shift is incremented by a constant value in different PRBs. The constant value can be 1, 5, 7 or 11. In one example, assuming constant cyclic shift value as 5, cyclic shift for the first PRB is 5, then the cyclic shift for second PRB is 10, and the cyclic shift for third PRB is 3 (due to modulo operation with regards to 12), and so on.

An example of the updated specification for cyclic shift hopping in Section 6.3.2.2.2 in TS 38.211 [1] is highlighted with underline as follows:

The cyclic shift a varies as a function of the symbol and slot number according to $$a_l = \frac{2\pi}{N_{sc}^{RB}}\left(\left(m_0 + m_{cs} + m_{\text{int}} + n_{ce}\left(n_{s,f}^{\mu} l + l'\right)\right) \bmod N_{sc}^{RB}\right)$$

where $n_{s,f}^{\mu}$ is the slot number in the radio frame l is the OFDM symbol number in the PUCCH transmission where l=0 corresponds to the first OFDM symbol of the PUCCH transmission, l' is the index of the OFDM symbol in the slot that corresponds to the first OFDM symbol of the PUCCH transmission in the slot given by [5, TS 38.213]

$m_0$ is given by [5, TS 38.213] for PUCCH format 0 and 1 while for PUCCH format 3 and 4 is defined in clause 6.4.1.3.3.1

$m_{cs}=0$ except for PUCCH format 0 when it depends on the information to be transmitted according to clause 9.2 of [5, TS 38.213].

$m_{int}$ is given by $m_{int}=5n_{1RB}^{\mu}$ for PUCCH formats 0 and 1 if PUCCH shall use interlaced mapping according to any of the higher-layer parameters useInterlacePUCCH-PUSCH in BWP-UplinkCommon or useInterlace-PUCCH-PUSCH in BWP-UplinkDedicated, where nipp is the resource block number within the interlace;

$m_{int}=5n_{RB}^{\mu}$ for PUCCH formats 0 and 1 if PUCCH shall use more than one PRB for transmission, where $n_{RB}^{\mu}$ is the resource block number within the PUCCH transmission bandwidth.

$m_{int}=0$ otherwise

Enhancement on PUCCH Format 4

Embodiments on enhancement of PUCCH format 4 are provided as follows:

In one embodiment, the number of PRBs for the transmission of PUCCH format 4 can be configured by higher layers via RMSI or RRC signalling or both. Furthermore, PUCCH format 4 is transmitted in contiguous PRBs in frequency domain. Within a PUCCH resource, starting PRB and number of PRBs can be configured for PUCCH format 4.

In another embodiment, when number of PRBs for PUCCH format 4 is greater than 1, block-wised orthogonal cover code (OCC) similar to PUCCH format 3 as defined in Rel-16 can be applied for the PUCCH format 4.

An example of the updated specification for block-wised spreading in Section 6.3.2.6.3 in TS 38.211 [1] is highlighted with underline as follows:

For PUCCH format 3 with interlaced mapping and PUCCH format 4, block-wise spreading shall be applied according to $$y(lM_{sc}^{PUCCH,s}+k) = w_n\left(\left\lfloor k\frac{N_{SF}^{PUCCH,s}}{M_{sc}^{PUCCH,s}}\right\rfloor\right)d\left(l\frac{M_{sc}^{PUCCH,s}}{N_{SF}^{PUCCH,s}} + k \bmod \frac{M_{sc}^{PUCCH,s}}{N_{SF}^{PUCCH,s}}\right)$$

$$k = 0, 1, \ldots, M_{sc}^{PUCCH,s} - 1$$

$$l = 0, 1, \ldots, (N_{SF}^{PUCCH,s} M_{symb}/M_{sc}^{PUCCH,s}) - 1$$

where for PUCCH format 3 with interlaced mapping, $N_{SF}^{PUCCH,3} \in \{1,2,4\}$ if a single interlace is configured and 1 $N_{SF}^{PUCCH,3}=1$, $w_n=1$ if two interlaces are configured;

for PUCCH format 4, $M_{RB}^{PUCCH,4} \geq 1$ as given by clauses 9.2.3, 9.2.5.1 and 9.2.5.2 of [5, TS 38.213], $N_{SF}^{PUCCH,4} \in \{2,4\}$;

Note that the above can be extended to the case when spreading factor of 3 and 6, or even larger values, including 8 and 12 are used, which can help increase the multiplexing capacity.

Table 1 illustrates one example of block-wised OCC code for spreading factor of 2, 3, 4 and 6 for PUCCH format 4.

TABLE 1

| $w_n$ (m) = $e^{j2n\phi\,(m)/N_{SF}}$ for PUCCH format 4 | | | | | |
|---|---|---|---|---|---|
| | | | $\phi$ | | |
| $N_{SF}$ n = 0 | n = 1 | n = 2 | n = 3 | n = 4 | n = 5 |
| 2 [0 0] | [0 1] | — | — | — | — |
| 3 [0 0 0] | [0 1 2] | [0 2 1] | — | — | — |
| 4 [0 0 0 0] | [0 1 2 3] | [0 2 0 2] | [0 3 2 1] | — | — |
| 6 [0 0 0 0 0 0] | [0 1 2 3 4 5] | [0 2 4 0 2 4] | [0 3 0 3 0 3] | [0 4 2 0 4 2] | [0 5 4 3 2 1] |

In another embodiment, in case when spreading factor of 3 and 6 is used, the cyclic shift value for demodulation reference signal (DMRS) associated with PUCCH format 4 can be generated in Table 2.

TABLE 2

| Cyclic shift index $m_0$ for PUCCH format 4 when $N_{SF}^{PUCCH,\,s}$ = 3 or 6 | | |
|---|---|---|
| Orthogonal sequence | Cyclic shift index $m_0$ | |
| index n | $N_{SF}^{PUCCH,s} = 3$ | $N_{SF}^{PUCCH,s} = 6$ |
| 0 | 0 | 0 |
| 1 | 4 | 4 |
| 2 | 8 | 8 |
| 3 | — | 2 |
| 4 | — | 6 |
| 5 | — | 10 |

In another embodiment, when maximum code rate is configured for PUCCH format 4 and when the number of PRBs configured for PUCCH format 4 is greater than 1, the actual number of PRBs for transmission of PUCCH format 4 can be determined in accordance with the maximum code rate such that effective code rate does not exceed the maximum configured code rate for PUCCH format 4.

The updated specification for Section 9.2.3 in TS38.213 [2] is highlighted with underline as follows:

If a UE transmits a PUCCH with $O_{ACK}$ HARQ-ACK information bits and $O_{CRC}$ bits using PUCCH format 2 or PUCCH format 3 or PUCCH format 4 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is smaller than or equal to a number of PRBs $M_{RB}^{PUCCH}$ provided respectively by nrofPRBs of PUCCH-format2 or nrofPRBs of PUCCH-format3 or nrofPRBs of PUCCH-format4 and start from the first PRB from the number of PRBs, that results to $(O_{ACK}+O_{CRC}) \leq M_{RB,min}^{PUCCH} \cdot N_{sc,ctrl}^{RB} \cdot N_{symb\,UCI}^{PUCCH} \cdot Q_m \cdot r$ and, if $M_{RB}^{PUCCH} > (O_{ACK} + O_{CRC}) > (M_{RB,min}^{PUCCH} - 1) \cdot N_{sc,ctrl}^{RB} \cdot N_{symb\,UCI}^{PUCCH} \cdot Q_m \cdot r$, where and $N_{sc,ctrl}^{RB}$, $M_{symb\,UCI}^{PUCCH}$, $Q_m$, and r are defined in Clause 9.2.5.2. For PUCCH format 3 and PUCCH format 4, if $M_{RB}^{PUCCH}$ is not equal $2^{\alpha_2} \cdot 3^{\alpha_3} \cdot 5^{\alpha_5}$ according to [4, TS 38.211], $M_{RB,min}^{PUCCH}$ is increased to the nearest allowed value of nrofPRBs for PUCCH-format3 or nrofPRBs of PUCCH-format4 [12, TS 38.331]. If $(O_{ACK}+O_{CRC}) > (M_{RB,min}^{PUCCH} - 1) \cdot N_{sc,ctrl}^{RB} \cdot N_{symb\,UCI\,N}^{PUCCH} \cdot Q_m \cdot r$, the UE transmits the PUCCH over $M_{RB}^{PUCCH}$ PRBs.

Note that similar text in Section 9.2.5.1 in TS38.213 [2] can be updated as above.

Enhancement on PUCCH Common Resource Set

Embodiments on enhancement of PUCCH common resource set are provided as follows:

In one embodiment, for common PUCCH resource set, the number of PRBs for PUCCH format 0 and 1 can be predefined in the specification or configured by RMSI or RRC signalling. When the number of PRBs for PUCCH format 0 and 1 is greater than 1, the PRB offset $RB_{BWP}^{offset}$ as defined in the Table 9.2.1-1 in TS38.213 [2] needs to be considered as the $M_{RB}^{PUCCH} RB_{BWP}^{offset}$, where $M_{RB}^{PUCCH}$ is the number of PRBs for the transmission of PUCCH format 0 and 1 when dedicated PUCCH resource set is not provided for a given UE.

The updated specification for Section 9.2.1 in TS38.213 [2] could be one of the following where the updated text is highlighted with underline:

If $\lfloor r_{PUCCH}/8 \rfloor=0$ and a UE is provided a PUCCH resource by pucch-ResourceCommon and is not provided useInterlacePUCCHCommon-r16 the UE determines the first PRB index of the PUCCH transmission in the first hop as $M_{RB}^{PUCCH} \cdot RB_{BWP}^{offset} + \lfloor r_{PUCCH}/N_{CS} \rfloor$ and the last PRB index of the PUCCH transmission in the second hop as $N_{BWP}^{size} - 1 - M_{RB}^{PUCCH} \cdot RB_{BWP}^{offset} + \lfloor r_{PUCCH}/N_{CS} \rfloor$, where $N_{CS}$ is the total number of initial cyclic shift indexes in the set of initial cyclic shift indexes and $M_{RB}^{PUCCH}$ is the number of PRBs for the PUCCH transmission.

the UE determines the initial cyclic shift index in the set of initial cyclic shift indexes as $r_{PUCCH}/N_{CS}$ If $\lfloor r_{PUCCH}/8 \rfloor=1$ and a UE is provided a PUCCH resource by pucch-ResourceCommon and is not provided useInterlacePUCCH-PUSCH in BWP-UplinkCommon the UE determines the last PRB index of the PUCCH transmission in the first hop as $N_{BWP}^{size}-1-$ $M_{RB}^{PUCCH} \cdot RB_{BWP}^{offset} + \lfloor(r_{PUCCH}-8)/N_{CS}\rfloor$, and the first PRB index of the PUCCH transmission in the second hop as $M_{RB}^{PUCCH} \cdot RB_{BWP}^{offset} + \lfloor(r_{PUCCH}-8)/N_{CS}\rfloor$ the UE determines the initial cyclic shift index in the set of initial cyclic shift indexes as $\lfloor r_{PUCCH}/8 \rfloor \bmod N_{CS}$.

In another example, the updated text can be modified as follows to create non overlapping hops:

If $\lfloor r_{PUCCH}/8 \rfloor = 0$ and a UE is provided a PUCCH resource by pucch-ResourceCommon and is not provided useInterlacePUCCHCommon-r16 the UE determines the first PRB index of the PUCCH transmission in the first hop as $M_{RB}^{PUCCH} \cdot (RB_{BWP}^{offset} + \lfloor r_{PUCCH}/N_{CS}\rfloor)$ and the first PRB index of the PUCCH transmission in the second hop as $N_{BWP}^{size} - M_{RB}^{PUCCH} \cdot (1 + RB_{BWP}^{offset} + \lfloor r_{PUCCH}/N_{CS}\rfloor)$, where $N_{CS}$ is the total number of initial cyclic shift indexes in the set of initial cyclic shift indexes and $M_{RB}^{PUCCH}$ is the number of PRBs for the PUCCH transmission.

the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon the UE determines the first PRB index of the PUCCH transmission in the first hop as $N_{BWP}^{size} - M_{RB}^{PUCCH} \cdot (1 + RB_{BWP}^{offset} + \lfloor(r_{PUCCH}-8)/N_{CS}\rfloor)$, and the first PRB index of the PUCCH transmission in the second hop as $M_{RB}^{PUCCH} \cdot (RB_{BWP}^{offset} + \lfloor(r_{PUCCH}-8)/N_{CS}\rfloor)$ the UE determines the initial cyclic shift index in the set of initial cyclic shift indexes as $(r_{PUCCH}-8)/N_{CS}$ In another example, the updated text can be modified as follows to create non overlapping hops:

If $\lfloor r_{PUCCH}/8 \rfloor = 0$ and a UE is provided a PUCCH resource by pucch-ResourceCommon and is not provided useInterlacePUCCHCommon-r16 the UE determines the first PRB index of the PUCCH transmission in the first hop as $M_{RB}^{PUCCH} \cdot (RB_{BWP}^{offset} + \lfloor r_{PUCCH}/N_{CS}\rfloor)$ and the last PRB index of the PUCCH transmission in the second hop as $N_{BWP}^{size} - 1 - M_{RB}^{PUCCH} \cdot (RB_{BWP}^{offset} + \lfloor r_{PUCCH}/N_{CS}\rfloor)$, where $N_{CS}$ is the total number of initial cyclic shift indexes in the set of initial cyclic shift indexes and $M_{RB}^{PUCCH}$ is the number of PRBs for the PUCCH transmission.

the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon the UE determines the last PRB index of the PUCCH transmission in the first hop as $N_{BWP}^{size} - 1 - M_{RB}^{PUCCH} \cdot (RB_{BWP}^{offset} + \lfloor(r_{PUCCH}-8)/N_{CS}\rfloor)$, and the first PRB index of the PUCCH transmission in the second hop as $M_{RB}^{PUCCH} \cdot (RB_{BWP}^{offset} + \lfloor(r_{PUCCH}-8)/N_{CS}\rfloor)$ the UE determines the initial cyclic shift index in the set of initial cyclic shift indexes as $(r_{PUCCH}-8) \bmod N_{CS}$ In another example, the updated text can be modified as follows:

If $\lfloor r_{PUCCH}/8 \rfloor = 0$ and a UE is provided a PUCCH resource by pucch-ResourceCommon and is not provided useInterlacePUCCHCommon-r16 the UE determines the first PRB index of the PUCCH transmission in the first hop as $M_{RB}^{PUCCH} \cdot RB_{BWP}^{offset} + \lfloor r_{PUCCH}/N_{CS}\rfloor$ and the first PRB index of the PUCCH transmission in the second hop as $N_{BWP}^{size} - M_{RB}^{PUCCH} \cdot (1 + RB_{BWP}^{offset}) + \lfloor r_{PUCCH}/N_{CS}\rfloor$, where $N_{CS}$ is the total number of initial cyclic shift indexes in the set of initial cyclic shift indexes and $M_{RB}^{PUCCH}$ is the number of PRBs for the PUCCH transmission.

the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon the UE determines the first PRB index of the PUCCH transmission in the first hop as $N_{BWP}^{size} - M_{RB}^{PUCCH} \cdot RB_{BWP}^{offset} + \lfloor(r_{PUCCH}-8)/N_{CS}\rfloor$, and the first PRB index of the PUCCH transmission in the second hop as $N_{BWP}^{size} - M_{RB}^{PUCCH} \cdot RB_{BWP}^{offset} + \lfloor(r_{PUCCH}-8)/N_{CS}\rfloor$ the UE determines the initial cyclic shift index in the set of initial cyclic shift indexes as $r_{PUCCH} \bmod N_{CS}$ Note that $M_{RB}^{PUCCH} = 1$ for Rel.15/16 UEs, and $M_{RB}^{PUCCH} \geq 1$ for Rel.17 UEs.

In another embodiment, frequency hopping mechanism is enhanced so that the separation among hops remain the same across the BW.

In one example, frequency hopping mechanism is defined so that two hops would be always defined such that they are separated by BW/2, where BW is the bandwidth of initial uplink bandwidth part (BWP) or active BWP. In this matter, the specification text in Sec. 9.2.1. in TS38.213 [2] could be updated as follows:

If $\lfloor r_{PUCCH}/8 \rfloor = 0$ and a UE is provided a PUCCH resource by pucch-ResourceCommon and is not provided useInterlacePUCCHCommon-r16 the UE determines the first PRB index of the PUCCH transmission in the first hop as $M_{RB}^{PUCCH} \cdot RB_{BWP}^{offset} + \lfloor r_{PUCCH}/N_{CS}\rfloor$ and the PRB index of the PUCCH transmission in the second hop as $$\frac{N_{BWP}^{size}}{2} + M_{RB}^{PUCCH} \cdot RB_{BWP}^{offset} + \lfloor r_{PUCCH}/N_{CS}\rfloor,$$

where $N_{CS}$ is the total number of initial cyclic shift indexes in the set of initial cyclic shift indexes and $M_{RB}^{PUCCH}$ is the number of PRBs for the PUCCH transmission.

the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon the UE determines the PRB index of the PUCCH transmission in the first hop as $$\frac{N_{BWP}^{size}}{2} + M_{RB}^{PUCCH} \cdot RB_{BWP}^{offset} - \lfloor(r_{PUCCH}-8)/N_{CS}\rfloor,$$

and the PRB index of the PUCCH transmission in the second hop as $M_{RB}^{PUCCH} \cdot RB_{BWP}^{offset} - \lfloor(r_{PUCCH}-8)/N_{CS}\rfloor$ the UE determines the initial cyclic shift index in the set of initial cyclic shift indexes as $r_{PUCCH} \bmod N_{CS}$ Under this example another possible alternative of the updated specification for Section 9.2.1 in TS38.213 [2] is highlighted in underline as follows:

If $\lfloor r_{PUCCH}/8 \rfloor = 0$ and a UE is provided a PUCCH resource by pucch-ResourceCommon and is not provided useInterlacePUCCHCommon-r16 the UE determines the first PRB index of the PUCCH transmission in the first hop as $M_{RB}^{PUCCH} \cdot (RB_{BWP}^{offset} + \lfloor r_{PUCCH}/N_{CS} \rfloor)$ and the PRB index of the PUCCH transmission in the second hop as $$\frac{N_{BWP}^{size}}{2} + M_{RB}^{PUCCH} \cdot (RB_{BWP}^{offset} - \lceil 8/N_{CS} \rceil) + \lfloor r_{PUCCH}/N_{CS} \rfloor,$$

where $N_{CS}$ is the total number of initial cyclic shift indexes in the set of initial cyclic shift indexes and $M_{RB}^{PUCCH}$ is the number of PRBs for the PUCCH transmission.

the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon the UE determines the PRB index of the PUCCH transmission in the first hop as $$\frac{N_{BWP}^{size}}{2} + M_{RB}^{PUCCH} \cdot RB_{BWP}^{offset} - \lfloor (r_{PUCCH} - 8)/N_{CS} \rfloor,$$

and the PRB index of the PUCCH transmission in the second hop as $M_{RB}^{PUCCH} \cdot (RB_{BWP}^{offset} - \lceil 8/N_{CS} \rceil) - \lfloor (r_{PUCCH} - 8)/N_{CS} \rfloor$ the UE determines the initial cyclic shift index in the set of initial cyclic shift indexes as $r_{PUCCH} \bmod N_{CS}$ In another embodiment, for common PUCCH resource set, the number of PRBs for PUCCH format 0 and 1, which may be configured by RMSI or RRC signalling, applies to all the resource sets. In this case, independently of which row of the PUCCH resources sets provided in Table 9.2.1-1 in TS 38.213 is used, the number of PRBs over which the related PUCCH spans is the same as that configured by the network via RMSI or RRC signalling.

In another embodiment, for common PUCCH resource set, based on the specific row of the PUCCH resources sets provided in Table 9.2.1-1 in TS 38.213 that is used, the number of PRBs over which the related PUCCH spans is calculated by applying a scaling factor α to the value which is configured by the network via RMSI. The scaling factor α can be UE specifically configured or hardcoded in the specification where a specific value would be indicated per each row and per each subcarrier spacing. In one option of this embodiment, α=1 for 120 KHz SCS for all rows. For 480 KHz SCS, a is chosen so that the number of PRBs for index 15 is always equal to 1 (e.g., α=1/$N_{RB}$, where $N_{RB}$ is the number of PRBs configured via RMSI).

In another embodiment, for some specific numerologies (e.g., subcarrier spacing and bandwidth part) the number of PRBs required for transmission of a PUCCH may be quite large compared to the bandwidth part itself, and the PUCCH resource partitioning in frequency domain may not be sufficient. In this case, depending on the subcarrier spacing and bandwidth part used, different time domain resource and code domain resource may be used, and the UE may not expect pucch-ResourceCommon to indicate some specific resource configuration defined in Table 9.2.1-1 in TS 38.213.

As an example, for subcarrier spacing of 120 KHz, 480 KHz, and 960 KHz, when the channel bandwidth is equal to 400 MHz, the common PUCCH resource set provided by the PUCCH resource configurations with row index {4-5-6}, {Aug. 9, 2010}, and {Dec. 13, 2014-15} are not proper given that the total number of PRBs is not sufficient for PUCCH resource partitioning in frequency domain. In this case, the UE does not expect pucch-ResourceCommon to indicate:

One or more of index 12,13,14, and/or 15 for subcarrier spacing of 120 KHz and/or 480 KHz when the channel bandwidth is equal to 400 MHz;

Index 6, 8, 14 and 15 for subcarrier spacing of 960 KHz when the channel bandwidth is equal to 400 MHz.

As an example, for 480 KHZ SCS

If number of PRBs that a UE need to use for a specific resource index, $N_{RB'}$, is $N_{RB'}$>11, then a UE is not expected to be configured with one or more of index 5,6,9,10,13,14, and/or 15;

If 7<=$N_{RB'}$<=11, then a UE is not expected to be configured with one or more of index 6,10,14, and/or 15;

If 1<$N_{RB'}$<7, then a UE is not expected to be configured with index 15;

If $N_{RB}$=1, then a UE is expected to be configured with any index.

In another embodiment, in order to enhance further multiplexing capabilities for some PUCCH resource set which have limited number of orthogonal PUCCH resources, additional time domain resource and code domain resource may be introduced on top of the one defined in Rel.15.

In one example, while UE does not expect pucch-ResourceCommon to indicate index 15, for the PUCCH resource sets provided by the PUCCH resource configuration with row index {4,5,6}, {Aug. 9, 2010}, and {Dec. 13, 2014}, one or more additional cover code can be used. For instance, an orthogonal cover code with index 1 can be additionally used for these PUCCH resource sets, as shown in Table 3.

TABLE 3

Potential modification to Table 9.2.1-1 in TS 38.213

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 1, 3, 6, 9} |
| 5 | 1 | 10 | 4 | 2 | {0, 1, 3, 6, 9} |
| 6 | 1 | 10 | 4 | 4 | {0, 1, 3, 6, 9} |
| 7 | 1 | 4 | 10 | 0 | {0, 6} |
| 8 | 1 | 4 | 10 | 0 | {0, 1, 3, 6, 9} |
| 9 | 1 | 4 | 10 | 2 | {0, 1, 3, 6, 9} |
| 10 | 1 | 4 | 10 | 4 | {0, 1, 3, 6, 9} |
| 11 | 1 | 0 | 14 | 0 | {0, 6} |
| 12 | 1 | 0 | 14 | 0 | {0, 1, 3, 6, 9} |
| 13 | 1 | 0 | 14 | 2 | {0, 1, 3, 6, 9} |
| 14 | 1 | 0 | 14 | 4 | {0, 1, 3, 6, 9} |
| 15 | 1 | 0 | 14 | $\lfloor N_{BWP}^{size}/4 \rfloor$ | {0, 3, 6, 9} |

In another example, for the PUCCH resource sets provided by the PUCCH resource configurations with row index 3, 7, and 11, the multiplexing capability may be further enhanced by the use of an additional orthogonal cover code (e.g., cover code with index 1).

In another example, for the PUCCH resource sets provided by the PUCCH resource configurations with row index {1,2}, the multiplexing capability may be further enhanced by additional starting symbol. Together with starting symbol 12, a UE may be configured to start the PUCCH transmission in symbol #7 or symbol #10 for 120 KHz subcarrier spacing, and in symbol #10 for 480 and 960 KHz subcarrier spacing.

In another example, for the common PUCCH resource set provided by the PUCCH resource configurations with row index {4, 5, 6}, the multiplexing capability may be further enhanced by additional starting symbol. Together with starting symbol 10, a UE may be configured to start the PUCCH transmission in symbol #3 or symbol #6 for 120 KHz subcarrier spacing, and in symbol #6 for 480 and 960 KHz subcarrier spacing.

Figure 3:
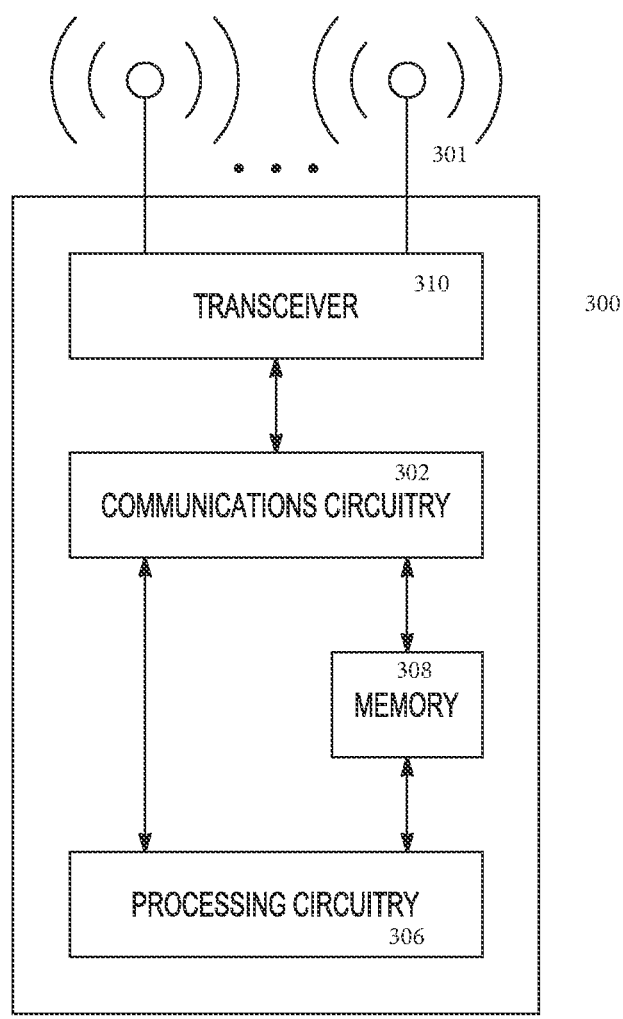
FIG. 3 is a functional block diagram of a wireless communication device in accordance with some embodiments.

FIG. 3 illustrates a functional block diagram of a wireless communication device, in accordance with some embodiments. Wireless communication device 300 may be suitable for use as a UE or gNB configured for operation in a 5G NR network.

The communication device 300 may include communications circuitry 302 and a transceiver 310 for transmitting and receiving signals to and from other communication devices using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The communication device 300 may also include processing circuitry 306 and memory 308 arranged to perform the operations described herein. In some embodiments, the communications circuitry 302 and the processing circuitry 306 may be configured to perform operations detailed in the above figures, diagrams, and flows.

In accordance with some embodiments, the communications circuitry 302 may be arranged to contend for a wireless medium and configure frames or packets for communicating over the wireless medium. The communications circuitry 302 may be arranged to transmit and receive signals.

The communications circuitry 302 may also include circuitry for modulation/demodulation, upconversion/downconversion, filtering, amplification, etc. In some embodiments, the processing circuitry 306 of the communication device 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication device 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 300 may include one or more of a keyboard, a display, a non-volatile memory port, multiple antennas, a graphics processor, an application processor, speakers, and other mobile device elements. The display may be an LCD screen including a touch screen.

Although the communication device 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 300 may refer to one or more processes operating on one or more processing elements.

Figure 4:
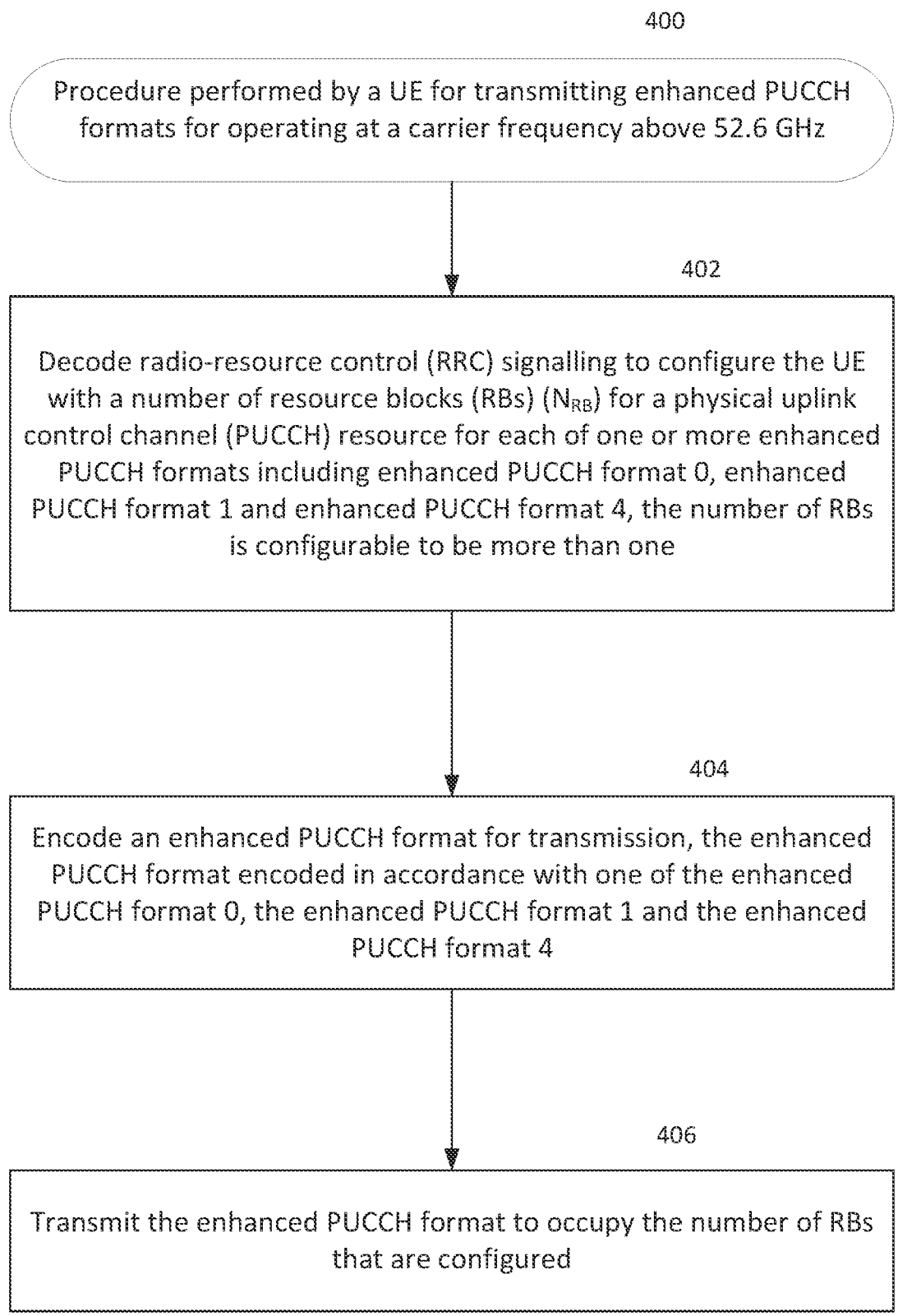
FIG. 4 illustrates is a procedure for transmitting enhanced PUCCH formats for operating at a carrier frequency above 52.6 GHz in accordance with some embodiments.

FIG. 4 illustrates is a procedure for transmitting enhanced PUCCH formats for operating at a carrier frequency above 52.6 GHz in accordance with some embodiments. Procedure 400 may be performed by a UE.

In operation 402, the UE may decode radio-resource control (RRC) signalling from the gNB to configure the UE with a number of resource blocks (RBs) ($N_{RB}$) for a physical uplink control channel (PUCCH) resource for each of one or more enhanced PUCCH formats including enhanced PUCCH format 0, enhanced PUCCH format 1 and enhanced PUCCH format 4. The number of RBs is configurable to be more than one.

In operation 404, the UE may encode an enhanced PUCCH format for transmission. The enhanced PUCCH format may be encoded in accordance with one of the enhanced PUCCH format 0, the enhanced PUCCH format 1 and the enhanced PUCCH format 4.

In operation 406, the UE may transmit the enhanced PUCCH format to occupy the number of RBs that are configured.

EXAMPLES

Example 1 may include a method of wireless communication for a fifth generation (5G) or new radio (NR) system: receiving, by a UE from a gNodeB (gNB), a configuration of a number of physical resource blocks (PRB) for transmission of physical uplink control channel (PUCCH) format 0, format 1 or format 4; and transmitting, by the UE, the PUCCH format 0, format 1 or format 4 in accordance with the configured number of PRBs.

Example 2 may include the method of example 1 or some other example herein, wherein the number of PRBs can be contiguous or non-contiguous.

Example 3 may include the method of example 1 or some other example herein, wherein the number of PRBs for the transmission of PUCCH format 0 and 1 can be configured by higher layers via remaining minimum system information (RMSI) or dedicated radio resource control (RRC) signalling.

Example 4 may include the method of example 1 or some other example herein, wherein when the number of PRBs for PUCCH format 0 and 1 is greater than 1, a long sequence can be used for signal generation, where the length of the sequence can be equal to the number of subcarriers for PUCCH format 0 and 1.

Example 5 may include the method of example 1 or some other example herein, wherein when the number of PRBs for PUCCH format 0 and 1 is greater than 1, same base sequence with length 12 as defined in Rel-15 PUCCH format 0 and 1 can be reused for each PRB, wherein cyclic shift hopping can be applied on the PUCCH transmission in different PRBs.

Example 6 may include the method of example 1 or some other example herein, wherein cyclic shift is incremented by a constant value in different PRBs, wherein the constant value can be 1, 5, 7 or 11.

Example 7 may include the method of example 1 or some other example herein, wherein within a PUCCH resource, starting PRB and number of PRBs can be configured for PUCCH format 4.

Example 8 may include the method of example 1 or some other example herein, wherein when number of PRBs for PUCCH format 4 is greater than 1, block-wised orthogonal cover code (OCC) similar to PUCCH format 3 as defined in Rel-16 can be applied for the PUCCH format 4.

Example 9 may include the method of example 1 or some other example herein, wherein spreading factor of 3 and 6, or even larger values, including 8 and 12 can be used for PUCCH format 4

Example 10 may include the method of example 1 or some other example herein, wherein in case when spreading factor of 3 and 6 is used, the cyclic shift value for demodulation reference signal (DMRS) associated with PUCCH format 4 can be determined in accordance with OCC index.

Example 11 may include the method of example 1 or some other example herein, wherein when maximum code rate is configured for PUCCH format 4 and when the number of PRBs configured for PUCCH format 4 is greater than 1, the actual number of PRBs for transmission of PUCCH format 4 can be determined in accordance with the maximum code rate such that effective code rate does not exceed the maximum configured code rate for PUCCH format 4.

Example 12 may include the method of example 1 or some other example herein, wherein for common PUCCH resource set, the number of PRBs for PUCCH format 0 and 1 can be predefined in the specification or configured by RMSI or RRC signaling.

Example 13 may include a method of a UE, the method comprising: receiving a configuration of a number of physical resource blocks (PRB) for transmission of a physical uplink control channel (PUCCH) with a PUCCH format 0, format 1 or format 4; and encoding the PUCCH for transmission based on the configured number of PRBs.

Example 14 may include the method of example 13 or some other example herein, wherein the number of PRBs is contiguous or non-contiguous.

Example 15 may include the method of example 13-14 or some other example herein, wherein the configuration is received via remaining minimum system information (RMSI) and/or dedicated radio resource control (RRC) signaling.

Example 16 may include the method of example 13-15 or some other example herein, wherein if the number of PRBs for PUCCH format 0 and 1 is greater than 1, the PUCCH is encoded using a sequence with a length equal to a number of subcarriers for PUCCH format 0 and 1.

Example 17 may include the method of example 13-15 or some other example herein, wherein if the number of PRBs for PUCCH format 0 and 1 is greater than 1, a same base sequence with length 12 (e.g., as defined in Rel-15 PUCCH format 0 and 1) is used for each PRB, wherein the encoding includes applying cyclic shift hopping on the PUCCH for transmission in different PRBs.

Example 18 may include the method of example 13-17 or some other example herein, wherein the PUCCH is transmitted with frequency hopping with separation among hops the same across a frequency bandwidth.

Example 19 may include the method of example 13-18 or some other example herein, wherein the PUCCH is transmitted with frequency hopping with a separation between two hops as half of a bandwidth of an initial bandwidth part or an active bandwidth part.

Example 20 may include the method of example 13-19 or some other example herein, wherein the method is performed by a UE or a portion thereof.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operating in a fifth-generation (5G) new radio (NR) network, the apparatus comprising: processing circuitry; and memory, wherein the processing circuitry is configured to:
   decode radio-resource control (RRC) signalling received from a gNodeB (gNB),
   wherein for operating at a carrier frequency above 52.6 GHZ, the RRC signalling to configure the UE with a number of physical resource blocks (PRBs) for a physical uplink control channel (PUCCH) resource for one or more PUCCH formats for carrying uplink control information (UCI), the one or more PUCCH formats including PUCCH format 0, PUCCH format 1 and PUCCH format 4; and
   encode symbols in accordance with one of the PUCCH format 0, the PUCCH format 1 and the PUCCH format 4 to carry the UCI,
   wherein for operating at the carrier frequency above 52.6 GHZ, the number of PRBs is configured to be more than one for the PUCCH format 0, the PUCCH format 1 and the PUCCH format 4,
   wherein the PUCCH format is transmitted to occupy the number of PRBs that are configured,
   wherein for operating at a carrier frequency not above 52.6 GHZ, the number of PRBs is limited to one for the PUCCH format 0, the PUCCH format 1 and the PUCCH format 4,
   wherein when frequency hopping is enabled, the processing circuitry is configured to determine PRB indices for each hop of a PUCCH transmission based on a bandwidth part (BWP), a specific resource set used, a number of initial cyclic shift indexes, and the number of PRBs, and
   wherein a lowest-indexed PRB for each PUCCH resource for each hop is scaled based on the number of PRBs, wherein the memory is configured to store the number of PRBs.

2. The apparatus of claim 1, wherein the RRC signalling configures the UE with the number of PRBs for one or more of the PUCCH formats,
wherein for operation at the carrier frequency above 52.6 GHz for subcarrier spacings (SCS) of 120 kHz, 480 kHz and 960 kHz, the number of PRBs configured to the UE range from a minimum of one PRB to a maximum value of sixteen (16) PRBs for the PUCCH format 0, the PUCCH format 1 and the PUCCH format 4.

3. The apparatus of claim 2, wherein the RRC signalling comprises a parameter that is provided by UE specific signalling per bandwidth part (BWP),
wherein the UE is configured to apply a SCS of the BWP, and
wherein for operation at the carrier frequency above 52.6 GHZ, the SCS is one of 120 KHz, 480 KHz, and 960 KHz.

4. The apparatus of claim 3, wherein for operating at the carrier frequency above 52.6 GHz, the processing circuitry is configured to generate a base sequence for the PUCCH format 0 and the PUCCH format 1 based on a Type-1 low PAPR sequence of a variable length that is based on the number of PRBs for the respective PUCCH format, and
wherein for operating at a carrier frequency below 52.6 GHz, the processing circuitry is configured to generate a base sequence for the PUCCH format 0 and the PUCCH format 1 based on a Type-1 low PAPR sequence of a fixed length.

5. An apparatus of a user equipment (UE) configured for operating in a fifth-generation (5G) new radio (NR) network, the apparatus comprising: processing circuitry; and memory, wherein the processing circuitry is configured to:
decode radio-resource control (RRC) signalling received from a gNodeB (gNB),
wherein for operating at a carrier frequency above 52.6 GHZ, the RRC signalling to configure the UE with a number of physical resource blocks (PRBs) for a physical uplink control channel (PUCCH) resource for one or more PUCCH formats for carrying uplink control information (UCI), the one or more PUCCH formats including PUCCH format 0, PUCCH format 1 and PUCCH format 4; and
encode symbols in accordance with one of the PUCCH format 0, the PUCCH format 1 and the PUCCH format 4 to carry the UCI,
wherein for operating at the carrier frequency above 52.6 GHZ, the number of PRBs is configurable to be more than one for the PUCCH format 0, the PUCCH format 1 and the PUCCH format 4,
wherein the PUCCH format is transmitted to occupy the number of PRBs that are configured,
wherein the memory is configured to store the number of PRBs,
wherein the RRC signalling configures the UE with the number of PRBs for one or more of the PUCCH formats,
wherein for operation at the carrier frequency above 52.6 GHz for subcarrier spacings (SCS) of 120 kHz, 480 kHz and 960 kHz, the number of PRBs configured to the UE range from a minimum of one PRB to a maximum value of sixteen (16) PRBs for the PUCCH format 0, the PUCCH format 1 and the PUCCH format 4,
wherein for operation at a carrier frequency below 52.6 GHZ, the number of PRBs for the PUCCH format 0, the PUCCH format 1 and the PUCCH format 4 is limited to one,
wherein the RRC signalling comprises a parameter that is provided by UE specific signalling per bandwidth part (BWP),
wherein the UE is configured to apply a SCS of the BWP,
wherein for operation at the carrier frequency above 52.6 GHz, the SCS is one of 120 KHz, 480 KHz, and 960 KHz,
wherein for operating at the carrier frequency above 52.6 GHz, the processing circuitry is configured to generate a base sequence for the PUCCH format 0 and the PUCCH format 1 based on a Type-1 low PAPR sequence of a variable length that is based on the number of PRBs for the respective PUCCH format, and
wherein for operating at a carrier frequency below 52.6 GHz, the processing circuitry is configured to generate a base sequence for the PUCCH format 0 and the PUCCH format 1 based on a Type-1 low PAPR sequence of a fixed length,
wherein the number of PRBs is equal to $2^{\alpha_2}*3^{\alpha_3}*5^{\alpha_5}$, where $\alpha_2$, $\alpha_3$, and $\alpha_5$ comprise non-negative integers, and
wherein for transmission of one of the PUCCH formats, the processing circuitry is configured to determine physical resource block indices based on the number of PRBs.

6. The apparatus of claim 5, wherein when frequency hopping is enabled and a specific PUCCH resource set is to be used, the PUCCH is transmitted in non-overlapping hops, and
wherein for the frequency hopping, the processing circuitry is configured to determine the PRB indices for each hop of the PUCCH transmission based on the BWP, the specific resource set used, a number of initial cyclic shift indexes, and the number of PRBs,
wherein a lowest-indexed PRB for each PUCCH resource for each hop is scaled based on the number of PRBs.

7. The apparatus of claim 5, wherein for transmission of the PUCCH, the processing circuitry is configured to determine an initial cyclic shift index from a total number of initial cyclic shift indexes within an index set for the PUCCH transmission.

8. The apparatus of any of claim 7, wherein for operating the carrier frequency below 52.6 GHz, the UE is configured to transmit a legacy PUCCH format to occupy a single RB, the legacy PUCCH format comprising one of a legacy PUCCH format 0, a legacy PUCCH format 1 and a legacy PUCCH format 4.

9. The apparatus of claim 1, wherein the processing circuitry is configured to decode a PUCCH resource configuration (pucch-ResourceCommon) information element that provides the UE with a PUCCH resource for transmission of the PUCCH.

10. The apparatus of claim 1, wherein the UCI for the PUCCH format 0 and the PUCCH format 1 comprises HARQ feedback information and a scheduling request (SR).

11. An apparatus of gNodeB (gNB) configured for operating in a fifth-generation (5G) new radio (NR) network, the apparatus comprising: processing circuitry; and memory,
wherein the processing circuitry is configured to:
encode radio-resource control (RRC) signalling for transmission to a user equipment (UE),
wherein for operating at a carrier frequency above 52.6 GHZ, the RRC signalling is encoded to configure the UE with a number of physical resource blocks (PRBs) for a physical uplink control channel (PUCCH) resource for one or more PUCCH formats for carrying uplink control information (UCI), the one or more PUCCH formats including PUCCH format 0, PUCCH format 1 and PUCCH format 4; and decode symbols encoded in accordance with one of the PUCCH format 0, the PUCCH format 1 and the PUCCH format 4 carrying the UCI, wherein for operating at the carrier frequency above 52.6 GHZ, the number of PRBs is configurable to be more than one for the PUCCH format 0, the PUCCH format 1 and the PUCCH format 4, wherein for operation at a carrier frequency below 52.6 GHz, the number of PRBs for the PUCCH format 0, the PUCCH format 1 and the PUCCH format 4 is limited to one, wherein when frequency hopping is enabled, PRB indices for each hop of a PUCCH transmission are determined based on a bandwidth part (BWP), a specific resource set used, a number of initial cyclic shift indexes, and the number of PRBs, and wherein a lowest-indexed PRB for each PUCCH resource for each hop is scaled based on the number of PRBs, and wherein the memory is configured to store the number of PRBs.

12. The apparatus of claim 11, wherein for operation at the carrier frequency above 52.6 GHz for subcarrier spacings (SCS) of 120 kHz, 480 kHz and 960 kHz, the number of PRBs are configured to the UE for the PUCCH format 0, the PUCCH format 1 and the PUCCH format 4, wherein the RRC signalling is encoded to include a parameter that is provided by UE specific signalling per bandwidth part (BWP), wherein the UE is configured to apply a SCS of the BWP, and wherein for operation at the carrier frequency above 52.6 GHz, the SCS is one of 120 KHz, 480 KHz, and 960 KHz.

13. The apparatus of claim 12, wherein for operating at the carrier frequency above 52.6 GHz, a base sequence for the PUCCH format 0 and the PUCCH format 1 is based on a Type-1 low PAPR sequence of a variable length that is based on the number of PRBs for the respective PUCCH format, and wherein for operating at a carrier frequency below 52.6 GHz, the base sequence for the PUCCH format 0 and the PUCCH format 1 is based on a Type-1 low PAPR sequence of a fixed length.

* * * * *